(12) United States Patent
Date et al.

(10) Patent No.: US 6,264,409 B1
(45) Date of Patent: Jul. 24, 2001

(54) TOOL HOLDER CLAMP DEVICE FOR SPINDLE AND SPINDLE APPARATUS

(75) Inventors: Takao Date, Shizuoka-ken; Yoshiaki Kai, Numazu; Katsuhito Endo, Fuji, all of (JP)

(73) Assignee: Toshiba Kikai Kabushiki Kaisha, Kawasaki (JP)

( * ) Notice: Subject to any disclaimer, the term of this patent is extended or adjusted under 35 U.S.C. 154(b) by 0 days.

(21) Appl. No.: 09/320,728

(22) Filed: May 27, 1999

(30) Foreign Application Priority Data

May 29, 1998 (JP) .................................................. 10-149180

(51) Int. Cl.⁷ ...................................................... B23Q 3/12
(52) U.S. Cl. ............................ 409/233; 409/135; 409/137
(58) Field of Search ................................... 409/135, 136, 409/137, 231, 233

(56) References Cited

U.S. PATENT DOCUMENTS

| | | | |
|---|---|---|---|
| 2,667,820 | * 2/1954 | DeVlieg | 409/233 |
| 3,038,386 | * 6/1962 | Parske et al. | 409/233 |
| 3,374,711 | * 3/1968 | Saunders | 409/233 |
| 3,823,642 | * 7/1974 | Jerue | 409/233 |

FOREIGN PATENT DOCUMENTS 10-76413   3/1998 (JP) .

* cited by examiner

Primary Examiner—Daniel W. Howell
(74) Attorney, Agent, or Firm—Finnegan, Henderson, Farabow, Garrett & Dunner, L.L.P.

(57) ABSTRACT

A tool holder clamp device for spindle, which is for clamping in a screw-fastening manner a shank portion of a tool holder to be incorporated to a spindle (1) in a removably fittable manner relative to a taper hole (9) formed at a distal end portion of the spindle (1), includes a clamp bolt member (23) rotatably and axially movably provided in a central through-hole (19) of the spindle (1) communicating with the taper hole (9), the clamp bolt member (23) having a threaded part (25) to be screwed in a threaded hole axially formed in the shank portion of the tool holder, the clamp bolt member (23) being adapted to fix the tool holder by fastening the shank portion by means of the threaded part (25), and a drive shaft body (29) rotatably and axially movably provided in the central through-hole (19) of the spindle (1), the drive shaft body (29) being adapted by axial movement thereof to engage with the clamp bolt member (23) for drive connection therewith to drive the clamp bolt member (23).

12 Claims, 5 Drawing Sheets

TOOL HOLDER CLAMP DEVICE FOR SPINDLE AND SPINDLE APPARATUS

BACKGROUND OF THE INVENTION

1. Field of the Invention

The present invention relates to a tool holder clamp device for spindle of a machine tool, and particularly, to a tool holder clamp device for spindle of a screw-fastening type, as well as to a spindle apparatus including such a tool holder clamp device.

2. Description of Relevant Art

As a tool holder clamp device for a spindle for high-speed rotation, there has been proposed in Japanese Patent Application Laid-Open Publication No. 10-76413 (1998) a device in which unbalancing factors are eliminated to suppress increase of inertial force in rotation of a spindle.

This device is a screw-fastening type in which a spindle has a taper hole formed in a distal end part thereof and a tool holder has a shank portion adapted for insertion to and draw-out from the taper hole, and by which the shank portion is clamped in a screw fastening manner. The screw-fastening type tool holder clamp device comprises a clamp bolt member, which has a threaded part provided in a central through-hole or hollow of the spindle communicating with the taper hole and adapted to be screwed in a threaded hole axially formed in the shank portion of the tool holder and which fixes the tool holder by fastening the shank portion by means of the threaded part, and a drive shaft body (as a draw-bar member), which is provided in the central through-hole and axially movable to engage with the clamp bolt member for drive connection therewith to thereby drive the clamp bolt member into rotation. When the spindle rotates, the drive shaft member is separated from the clamp bolt member so that unbalancing factors of the spindle are eliminated, and the spindle has a reduced weight.

In such a screw-fastening type tool holder clamp device, as a clamp bolt member is incorporated to a spindle and not allowed to axially move, when the clamp bolt member is driven into rotation for attachment or detachment of a tool holder, it is necessary to change an axial relative position between a spindle apparatus and the tool holder in accordance with a screw lead.

Therefor, in use of an automatic tool exchange device to effect automatic exchange of tool, there is necessitated a synchronous control between the clamp bolt member to be rotated and the spindle apparatus to be axially moved in conjunction therewith.

However, the clamp bolt member to be separable from a drive shaft body, which serves as a body of rotary drive to rotate the clamp bolt member, is connected thereto by a mating between a polygonal column and a polygonal hole for example, and a quantity of rotation of the rotary drive body does not always coincide with that of the clamp bolt member, so that the rotation quantity of the rotary drive body cannot be based on for control of a rotation quantity of the clamp bolt member. It is thus difficult for a quantity of rotation of the clamp bolt member and a quantity of axial movement of the spindle apparatus to be associated with each other for synchronous control therebetween, with the result that such a conventional screw-fastening type tool holder clamp device is unable to cope with the use of an automatic tool exchange device.

SUMMARY OF THE INVENTION

The present invention has been achieved with such points in view.

It therefore is an object of the present invention to provide a screw-fastening type tool holder clamp device for spindle which can easily cope with the use of an automatic tool exchange apparatus and which is improved such that foreign matters in a mating region between a taper hole of a spindle and a shank portion of a tool holder can be removed in an effective manner and that the spindle to be rotated at high speed can be cooled effectively. It also is an object of the invention to provide a spindle apparatus including such a screw-fastening type tool holder clamp.

To achieve the object, an aspect of the invention provides a tool holder clamp device for spindle for clamping, in a screw-fastening manner, a shank portion of a tool holder to be incorporated to a spindle in a removably fittable manner relative to a taper hole formed at a distal end portion of the spindle, the tool holder clamp device for spindle comprising a clamp bolt member rotatably and axially movably provided in a central through-hole of the spindle communicating with the taper hole, the clamp bolt member having a threaded part to be screwed in a threaded hole axially formed in the shank portion of the tool holder, the clamp bolt member being adapted to fix the tool holder by fastening the shank portion by means of the threaded part, and a drive shaft body rotatably and axially movably provided in the central through-hole of the spindle, the drive shaft body being adapted by axial movement thereof to engage with the clamp bolt member for drive connection therewith to drive the clamp bolt member into rotation.

According to this aspect of the invention, the clamp bolt member is adapted to axially move by a screw lead of a screwed engagement with the tool holder, as it rotates, and the device can easily cope with the use of an automatic tool exchange apparatus without the need of synchronous control between a rotation quantity of clamp bolt member and an axial movement quantity of spindle.

According to another aspect of the invention, the tool holder clamp device for spindle further comprises a thrust roller bearing member disposed in place where the clamp bolt member faces a stepped end face in the central through-hole of the spindle.

According to this aspect of the invention, as the thrust roller bearing member intervenes between the clamp bolt member and the stepped end face in the central through-hole of the spindle, there is achieved a prevention of seizure between the spindle and the clamp bolt member having their faces opposing each other in a thrust direction.

According to another aspect of the invention, the tool holder clamp device for spindle further comprises an air supply hole formed in the drive shaft body for supplying air from a proximal end side of the drive shaft body to a distal end side thereof, and an air discharge hole formed through a core part of the clamp bolt member to receive air supplied from the air supply hole.

According to this aspect of the invention, as air is supplied from the air supply hole to the air discharge hole provided through the core part of the clamp bolt member, discharged air from the air discharge hole to the taper hole blows off foreign matters from between the taper hole and the shank portion of the tool holder, and prevents their accumulation and deposition, and automatic tool exchange can be performed in an ensured manner.

According to another aspect of the invention, the tool holder clamp device for spindle further comprises an air supply hole formed in the drive shaft body for supplying air from a proximal end side of the drive shaft body to a distal end side thereof, and the drive shaft body alternately having large diameter shaft portions slightly smaller in diameter than the central through-hole of the spindle and small diameter shaft portions smaller in diameter than the large diameter shaft portions.

According to this aspect of the invention, as the large diameter shaft portions and the small diameter shaft portions are alternately provided on the drive shaft body, the cooling air path provided between the outer circumference of the drive shaft body and the inner circumference of the central through-hole is changed in sectional area so that discharged air from the distal end part of the air supply hole into the central through-hole has turbulent streams, which flow through the gap between the outer circumference of the drive shaft body and the inner circumference of the central through-hole, and the spindle can be effectively cooled from the central through-hole.

According to another aspect of the invention, the tool holder clamp device for spindle further comprises an air supply hole formed in the drive shaft body for supplying air from a proximal end side of the drive shaft body to a distal end side thereof, and a spiral groove formed in an outer circumference of the drive shaft body for discharging air of the central through-hole of the spindle by rotation of the drive shaft body in a screw-pumping manner.

According to this aspect of the invention, as the spiral groove is formed in the outer circumference of the drive shaft body, rotation of the drive shaft body causes air in the central through-hole of the spindle to be discharged in a screw-pumping manner, and temperature of air in the central through-hole falls so that the spindle is effectively cooled from inside.

According to another aspect of the invention, the tool holder clamp device for spindle further comprises an air supply hole formed in the drive shaft body for supplying air from a proximal end side of the drive shaft body to a distal end side thereof, and an air discharge hole radially formed in the drive shaft body, the air discharge hole directly communicating with the air supply hole and opening in an outer circumference of the drive shaft body.

According to this aspect of the invention, as the air supply hole extends through associated portions of the drive shaft body and the air discharge hole opens in the outer circumference of the drive shaft body, streams of air can effectively cool local regions of the spindle relatively high of temperature, such as about a bearing member and a rotor, so that the spindle can have a uniform temperature.

According to another aspect of the invention, the tool holder clamp device for spindle further comprises a cooling mechanism incorporated in the drive shaft body.

According to this aspect of the invention, as the cooling mechanism is incorporated in the drive shaft body, the spindle is effectively cooled from inside.

According to another aspect of the invention, the cooling mechanism comprises a cooling oil circulation path for flowing cooling oil therethrough to cool the drive shaft body.

According to this aspect of the invention, the drive shaft body is cooled with cooling oil flowing through the cooling oil circulation path formed in the drive shaft body, so that the spindle is effectively cooled from inside.

According to another aspect of the invention, the cooling mechanism comprises a thermoelectric element attached to the drive shaft body.

According to this aspect of the invention, the spindle is effectively cooled from inside by the thermoelectric element attached to the drive shaft body.

Further, to achieve the object described, another aspect of the invention provides a spindle apparatus for machine tools comprising a spindle member axially hollowed, a first drive for driving the spindle member to rotate, a tool holder, a clamp bolt member axially movable in the spindle member and rotatable to clamp the tool holder to the spindle member, a draw-bar member axially movable in the spindle member and rotatable to rotate the clamp bolt member, and a second drive for driving the draw-bar member to rotate.

According to this aspect of the invention, the clamp bolt member is axially movable like the draw-bar member, and connectable to a selective one of the first and second drives without the need of considerations to a screw lead.

According to another aspect of the invention, the draw-bar member has a coolant circuit formed therein.

According to this aspect of the invention, the draw-bar member can be effectively cooled from inside.

According to another aspect of the invention, the draw-bar member has a thermoelectric element attached thereto.

According to this aspect of the invention, the spindle member can be effectively cooled from inside.

BRIEF DESCRIPTION OF THE DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
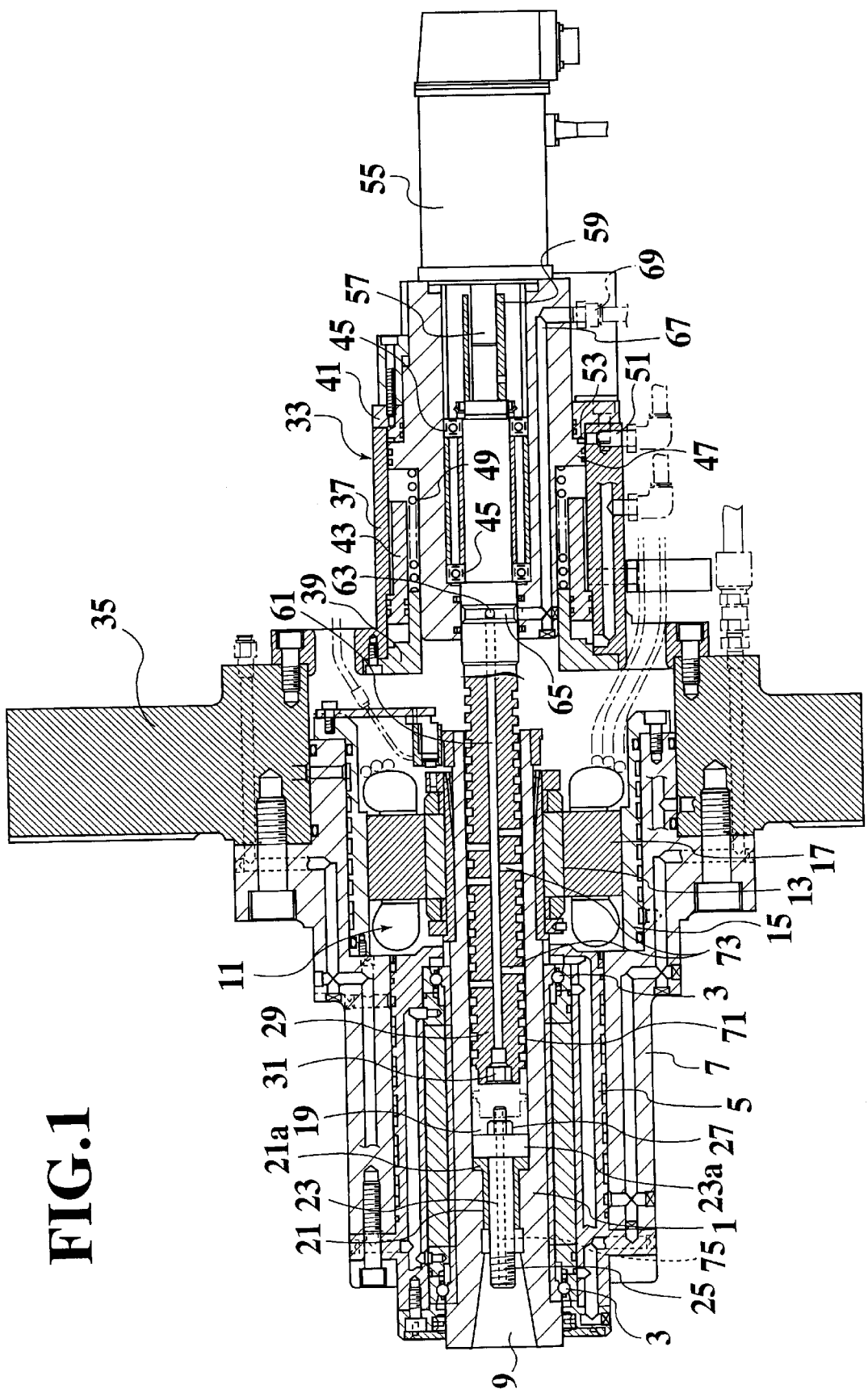
FIG. 1 is a longitudinal section of a spindle apparatus including a tool holder clamp device for spindle according to a first embodiment of the invention.

There will be detailed below the preferred embodiments of the present invention with reference to the accompanying drawings. Like members are designated by like reference characters.

(First Embodiment)

FIG. 1 shows a spindle apparatus with an incorporated tool holder clamp device according to a first embodiment of the invention.

The spindle apparatus has a hollow or tubular spindle member (hereafter simply called "spindle") 1 coaxially hollowed to provide a cylindrical chamber (hereafter sometimes called "central through-hole") 19, which is radially inwardly stepped or throated to have a reduced diameter near a distal end (left end in the figure), where it diverges to constitute a taper hole 9. The spindle 1 is supported with a pair of bearing members 3 installed at left and right ends of a spindle supporting body 5, which is formed with coolant paths and fixed in a cooling and protective jacket or outer case 7. The spindle 1 is thus rotatable relative to the supporting body 5. The taper hole 9 formed in a distal end portion of the spindle 1 is shaped to conformally receive a taper shank portion S of a tool holder T (see FIGS. 2A to 2F), which is removably fitted in the taper hole 9 and clamped or fastened thereto in a later-described manner.

A built-in motor 11 for driving the spindle is incorporated to the outer case 7. The built-in motor 11 is composed of a rotor 13 fixed to the spindle 1 and a stator 17 which is fixed to the outer case 7 via a cooling sleeve 15 to drive the spindle 1 for high speed rotation.

The central through-hole 19 of the spindle 1 coaxially communicates with the taper hole 9. In the central through-hole 19, a clamp bolt member 23 is disposed via a bush 21 rotatably and axially movably. The clamp bolt member 23 has a threaded part 25 at its distal end, and the threaded part 25 is screwed into a threaded hole H axially formed in the shank portion S of the tool holder T. When a flanged part 21a at one end of the bush 21 abuts against a flanged part 23a, the axial movement of the clamp bolt member 23 towards the taper hole 9 is restricted so that the tool holder T is fixed to the spindle 1 by fastening the shank portion S via the threaded part 25.

A hexagonal column portion 27 for rotating the clamp bolt member 23 by means of a drive shaft body 29 is provided at a proximal end of the clamp bolt member 23.

The drive shaft body 29 is inserted into the central through-hole 19 from a proximal end of the spindle 1 rotatably and axially movably. A hexagon socket 31 which receives the hexagonal column portion 27 is formed at the distal end portion of the drive shaft body 29. When the drive shaft body 29 moves forward in the axial direction with respect to the spindle 1, the hexagonal column portion 27 is fitted in the hexagon socket 31, and the drive shaft body 29 is driven to be connected to the clamp bolt member 23, in a torque transmission relationship.

A fluid pressure cylinder device 33 for axially moving the drive shaft body 29 is provided at a proximal end of the drive shaft body 29. The fluid pressure cylinder device 33 has a cylinder tube 37 fixed to a base member 35 integral with the outer case 7, end pieces 39 and 41 on both ends, an inner sleeve 43, a sleeve-shaped piston member 47 connected to the drive shaft body 29 via a bearing member 45, and a compressed spring 49 which resiliently biases the piston member 47 backward. When a fluid pressure is supplied from a port 51 to a cylinder chamber 53, the fluid pressure cylinder device 33 moves the drive shaft body 29 forward against a resilient force of the compressed spring 49.

A motor 55 for rotating the drive shaft body is attached to the piston member 47, and a rotation shaft 57 of the motor 55 is connected to the drive shaft body 29 via a shaft joint 59.

An air supply hole 61, which axially extends in the core part and communicates at its distal end with the hexagon socket 31, is formed in the drive shaft body 29. The proximal end of the air supply hole 61 communicates with air supply path 67 formed in the piston member 47 by a hole 63 and a circumferential groove 65 formed in the drive shaft body 29, and air is supplied from an air supply piping 69 connected to the air supply path 67.

A spiral groove 71 is formed on an outer circumference of the drive shaft body 29. The rotation of the drive shaft body 29 discharges air of the central through-hole 19 in the spindle 1 through the spiral groove 71 in a screw-pumping manner.

Air discharge holes 73, which radially extend in the drive shaft body 29 and directly communicate with the air supply hole 61 and open in the outer circumference of the drive shaft body, are formed in specified positions of the drive shaft body 29, namely, in positions corresponding to locations where the spindle 10 has high temperature, such as portions where the bearing member 3 and rotor 13 are arranged.

In addition, an air discharge hole 75 is axially formed to extend through a core part of the clamp bolt 23 and the hexagonal column portion 27. When the hexagonal column portion 27 of the clamp bolt 23 is fitted in the hexagon socket 31 of the drive shaft body 29, the air discharge hole 75 is in communication with or connected to the air supply hole 61, and air is supplied from the air supply hole 61.

Next, there will be described below clamping actions of the tool holder clamp vice with reference to FIGS. 2A through 2F.

Figure 2A:
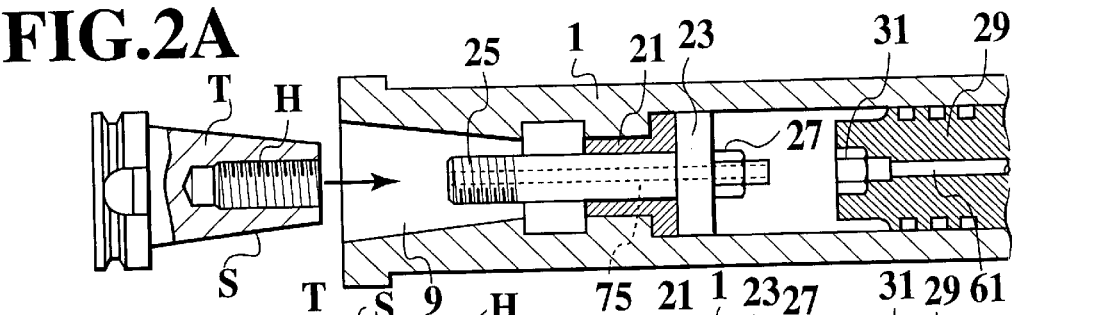
FIGS. 2A, 2B, 2C, 2D, 2E, and 2F are fragmentary sections illustrating clamping actions of the tool holder clamp device of FIG. 1.

(1) As shown in FIG. 2A, the tool holder T is carried onto the center axial line of the spindle 1 by an automatic tool controller or ATC (not shown).

Figure 2B:
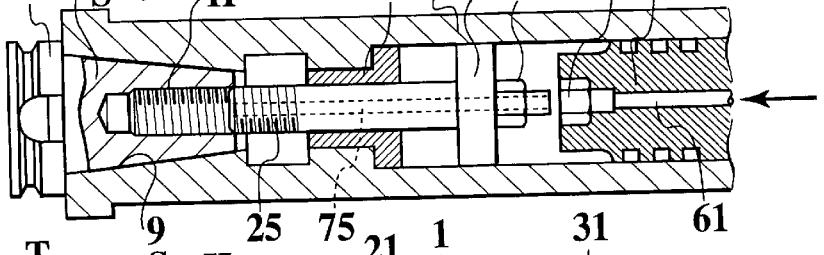

(2) Next, the tool holder T is carried to the side of the spindle 1 by the ATC. As a result, as shown in FIG. 2B, the shank portion S of the tool holder T is inserted to be fitted in the taper hole 9 of the spindle 1, and accordingly the clamp bolt member 23 is pushed by the distal end face of the shank portion S so that the clamp bolt member 23 is axially displaced with respect to the spindle 1 towards a retreat direction (rightward in the figure).

Figure 2C:
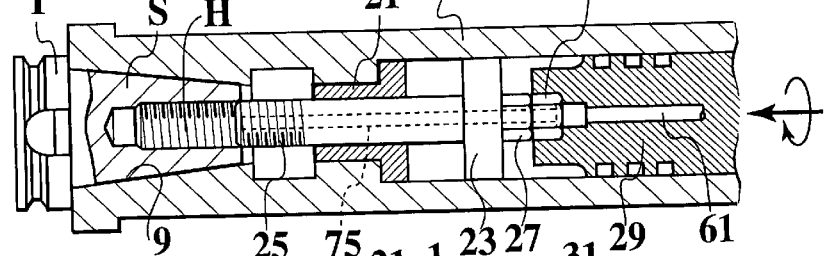
Figure 2D:
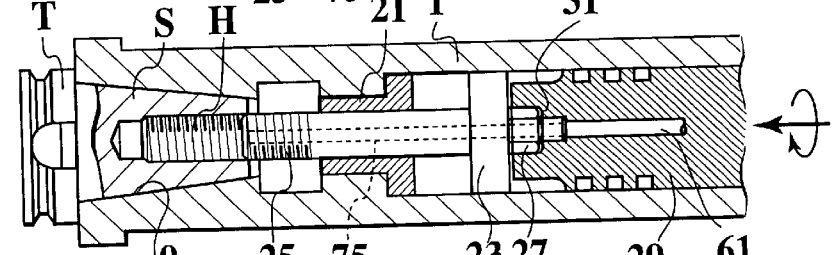

(3) Next, when a fluid pressure is supplied to the cylinder chamber 53 of the fluid pressure cylinder device 33, the piston member 47 moves the drive shaft body 29 forward against the resilient force of the compressed spring 49. As a result, as shown in FIG. 2C, the distal end of the drive shaft body 29 abuts on the hexagonal column portion 27 of the clamp bolt member 23, and the drive shaft body 29 is rotated by the motor 55 so that, as shown in FIG. 2D, the hexagonal column portion 27 of the clamp bolt member 23 is fitted in the hexagon socket 31 of the drive shaft body 29 and the drive shaft body 29 is connected to the clamp bolt member 23.

Here, since the forward movement force of the drive shaft body 29 is set to be smaller than the tool holder insertion force by means of the ATC, even if the distal end of the drive shaft body 29 abuts against the hexagonal column portion 27 of the clamp bolt member 23, the tool holder T is not drawn out of the taper hole 9.

When the drive shaft body 29 is connected to the clamp bolt member 23 as mentioned above, the air supply hole 61 of the drive shaft body 29 communicates to be connected to the air discharge hole 75 of the clamp bolt member 23, and air is supplied from the air supply hole 61 to the air discharge hole 75. The air supplied to the air discharge hole 75 is discharged from the distal end of the clamp bolt member 23 into the taper hole 9. As a result, blowing-off of foreign matters attached to the taper hole 9 and the shank portion S of the tool holder T is eliminated, and foreign matters are prevented from being attached to the taper hole 9 and the shank portion S of the tool holder T.

Figure 2E:
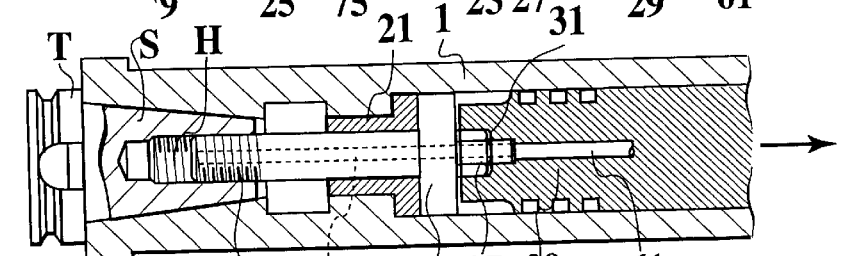
Figure 2F:
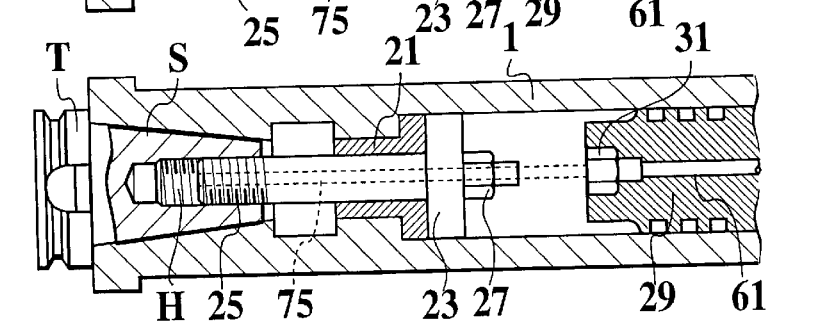

(4) When the drive shaft body 29 is rotated by the motor 55, the clamp bolt member 23 also rotates, and the threaded part 25 of the clamp bolt member 23 is screwed into the threaded hole H of the shank portion S of the tool holder T so that the clamp bolt member 23 moves to a forward direction (left direction in the figure) by the screw leads. As shown in FIG. 2E, the flanged part 23a of the clamp bolt member 23 abuts against the flanged part 21a of the bush 21 by the rotation of the clamp bolt member 23, and the clamp bolt member 23 is further rotated so that the shank portion S of the tool holder T is strongly drawn into the taper hole 9 by a screw force and the fastening of the tool holder T is completed.

(5) The completion of the fastening of the tool holder T stops the rotation of the drive shaft body 29 by means of the motor 55, and the fluid pressure in the cylinder chamber 53 of the fluid pressure cylinder device 33 is released so that the piston member 47 moves the drive shaft body 29 backward against the resilient force of the compressed spring 49. As a result, the drive shaft body 29 is separated from the clamp bolt member 23. When the ATC is returned to its original position, the clamping of the tool holder T is completed.

Here, the tool holder T is detached following reverse steps of clamping actions.

The spindle 1 is rotated at high speed in a state that the drive shaft body 29 is separated from the clamp bolt member 23. When the spindle is rotated at high speed, the air supplied to the air supply hole 61 flows in the central through-hole 19 via the hexagon socket 31 and flows through a gap between the inner circumference of the central through-hole 19 and the outer circumference of the drive shaft body 29 towards the axial retreat direction so that the spindle 1 is cooled from its inner side. Moreover, part of the air supplied to the air supply hole 61 is directly discharged towards the spindle 1 from the air discharge holes 73, and portions of the spindle 1 where temperature is high, such as portions where the bearing member 3 and the rotor 13 are arranged, are cooled partially. As a result, the temperatures of the spindle 1 in the radial direction and the axial direction becomes uniform.

In addition, when the drive shaft body 29 is rotated by the motor 55 separately from the spindle 1, the spiral groove 71 discharges air of the central through-hole 19 in the spindle 1 in a screw-pumping manner. As a result, air temperature in the central through-hole 19 falls, and the spindle 1 is cooled from its inner side. In general, since the spindle 1 is cooled from its outer side by the outer case 7, it is effective to reduce a gradient of the temperature of the spindle 1 in the radial direction to cool the spindle 1 from its inner side.

(Second Embodiment)

Figure 3:
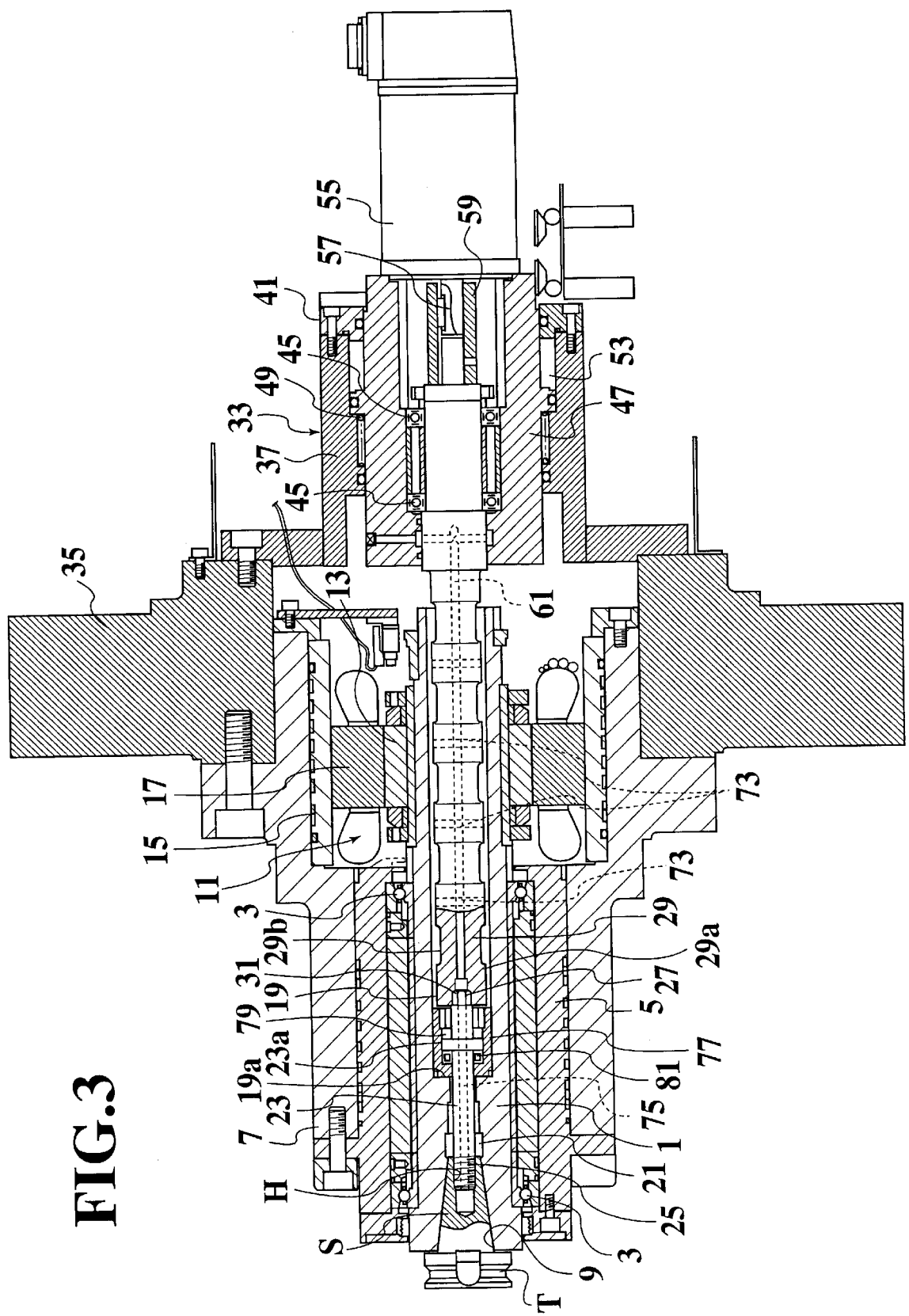
FIG. 3 is a longitudinal section of a spindle apparatus including a tool holder clamp device for spindle according to a second embodiment of the invention.

FIG. 3 shows the spindle apparatus with the incorporated tool holder clamp device for spindle according to the second embodiment of the invention. Here, the same reference numerals are given to portions in FIG. 3 corresponding to those in FIG. 1, and the description thereof is omitted.

In the embodiment, a bearing case 77 is provided in the central through-hole 19 so as to be capable of axially sliding, and the clamp bolt member 23 is supported by a radial ball bearing 79 rotatably from the bearing case 77, and a thrust roller bearing 81 is arranged in a portion in the bearing case 77 where the clamp bolt member 23 faces a stepped end face 19a in the central through-hole 19 of the spindle 1. In this case, the clamp bolt member 23 as well as the bearing case 77 axially moves in the central through hole 19.

The drive shaft body 29 has large diameter shaft portions 29a whose diameter is slightly smaller than that of the central through-hole 19 of the spindle 1 and small diameter shaft portions 29b whose diameter is smaller than that of the large diameter shaft portions 29a so that they are arranged alternately.

In this embodiment, when the threaded part 25 of the clamp bolt member 23 is engaged with the threaded hole H of the tool holder T so that the clamp bolt member 23 fastens the tool holder T, a thrust force generated between the spindle 1 and the clamp bolt member 23 is received by the thrust roller bearing 81, and the clamp bolt member 23 rotates with respect to the spindle 1 by the thrust roller bearing 81 at low resistance.

As a result, seizure of thrust opposite faces of the clamp bolt member 23 and the spindle 1 at the time of clamping is prevented.

In addition, in this embodiment, since the drive shaft body 29 has the large diameter shaft portions 29a and the small diameter shaft portions 29b alternately, a sectional area of a cooling air path provided between the outer circumference of the drive shaft body 29 and the inner circumference of the central through-hole 19 is changed, and turbulence occurs in the air which is discharged from the distal end of the air supply hole 61 into the central through-hole 19 and flows through the gap between the outer circumference of the drive shaft body 29 and the inner circumference of the central through-hole 19. As a result, the spindle 1 is cooled from the central through-hole 19 effectively.

(Third Embodiment)

Figure 4:
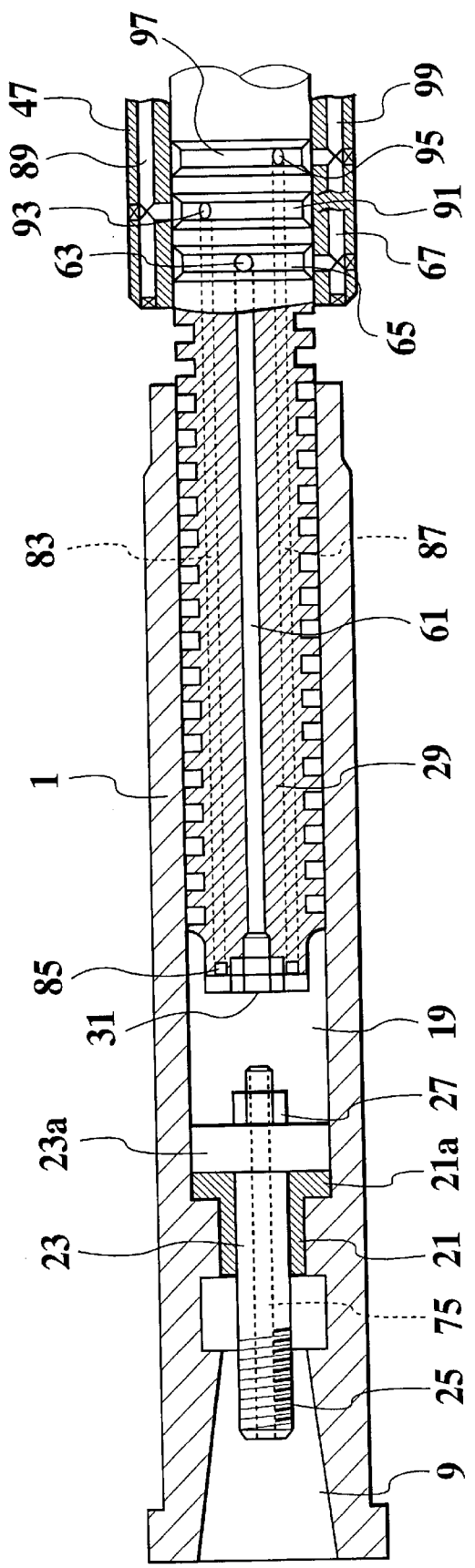
FIG. 4 is a longitudinal section of an essential part of a spindle apparatus including a tool holder clamp device for spindle according to a third embodiment of the invention.

FIG. 4 shows a main section of the spindle apparatus with the incorporated tool holder clamp device for spindle according to the third embodiment of the invention. Here, the same reference numerals are given also to parts in FIG. 4 corresponding to those in FIG. 1, and the description thereof is omitted.

In the embodiment, cooling oil circulation paths 83, 85 and 87 are formed in the drive shaft body 29.

A cooling oil is supplied from a cooling oil supply path 89 formed in the piston member 47 to the cooling oil circulation path 83 via a circumference groove 91 and a hole 93, and the cooling oil supplied to the cooling oil circulation path 83 flows into the cooling oil circulation paths 83, 85 and 87 in the drive shaft body 29 successively so as to flow into a cooling oil discharge path 99 formed in the piston member 47 via a hole 95 and a circumference groove 97.

As a result, the drive shaft body 29 is maintained at a low temperature so as to serve as a cooling bar and cool the spindle 1 from its inner side, and a gradient of the temperature of the spindle 1 in the radial direction becomes small.

(Fourth Embodiment)

Figure 5:
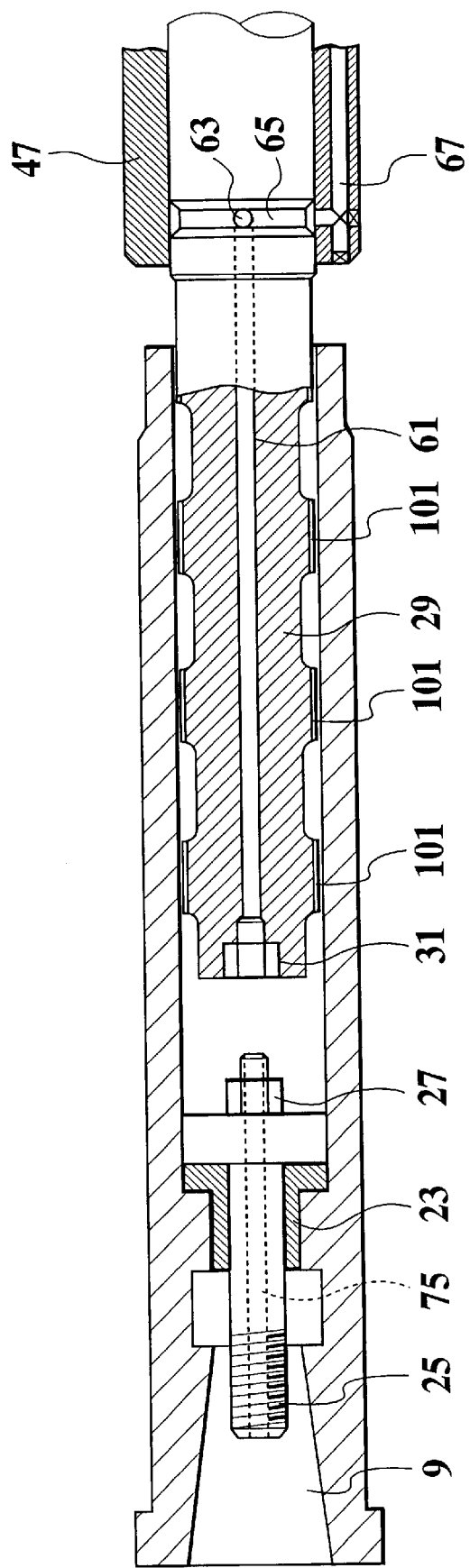
FIG. 5 is a longitudinal section of an essential part of a spindle apparatus including a tool holder clamp device for spindle according to a fourth embodiment of the invention.

FIG. 5 shows a main section of the spindle apparatus with the incorporated tool holder clamp device for spindle according to the fourth embodiment of the invention. Here, the same reference numerals are given to also the parts in FIG. 5 corresponding to those in FIG. 1, and the description thereof is omitted.

In the embodiment, a thermoelectric element 101 such as a Peltier effect element is stuck to the outer circumference of the drive shaft body 29. As for the thermoelectric element 101, its outer face is an endothermic face (low temperature face), and it cools the spindle 1 from its inner side. As a result, the gradient of the temperature of the spindle 1 in the radial direction is reduced.

While preferred embodiments of the present invention have been described using specific terms, such description is for illustrative purposes, and it is to be understood that changes and variations may be made without departing from the spirit or scope of the following claims.

What is claimed is:

1. A tool holder clamp device for spindle for clamping, in a screw-fastening manner, a shank portion of a tool holder to be incorporated to a spindle in a removably fittable manner relative to a taper hole formed at a distal end portion of the spindle, the tool holder clamp device for spindle comprising:

a clamp bolt member rotatably and axially movably provided in a central through-hole of the spindle communicating with the taper hole, the clamp bolt member having a threaded part to be screwed in a threaded hole axially formed in the shank portion of the tool holder, the clamp bolt member being adapted to fix the tool holder by fastening the shank portion by means of the threaded part; and a drive shaft body rotatably and axially movably provided in the central through-hole of the spindle, the drive shaft body being adapted by axial movement thereof to engage with the clamp bolt member for drive connection therewith to drive the clamp bolt member into rotation.

2. The tool holder clamp device for spindle of claim 1, further comprising a thrust roller bearing member disposed in place where the clamp bolt member faces a stepped end face in the central through-hole of the spindle.

3. The tool holder clamp device for spindle of claim 1, further comprising:

an air supply hole formed in the drive shaft body for supplying air from a proximal end side of the drive shaft body to a distal end side thereof; and an air discharge hole formed through a core part of the clamp bolt member to receive air supplied from the air supply hole.

4. The tool holder clamp device for spindle of claim 1, further comprising:

an air supply hole formed in the drive shaft body for supplying air from a proximal end side of the drive shaft body to a distal end side thereof; and the drive shaft body alternately having large diameter shaft portions slightly smaller in diameter than the central through-hole of the spindle and small diameter shaft portions smaller in diameter than the large diameter shaft portions.

5. The tool holder clamp device for spindle of claim 1, further comprising:

an air supply hole formed in the drive shaft body for supplying air from a proximal end side of the drive shaft body to a distal end side thereof; and a spiral groove formed in an outer circumference of the drive shaft body for discharging air of the central through-hole of the spindle by rotation of the drive shaft body in a screw-pumping manner.

6. The tool holder clamp device for spindle of claim 1, further comprising:

an air supply hole formed in the drive shaft body for supplying air from a proximal end side of the drive shaft body to a distal end side thereof; and an air discharge hole radially formed in the drive shaft body, the air discharge hole directly communicating with the air supply hole and opening in an outer circumference of the drive shaft body.

7. The tool holder clamp device for spindle of claim 1, further comprising a cooling mechanism incorporated in the drive shaft body.

8. The tool holder clamp device for spindle of claim 7, wherein the cooling mechanism comprises a cooling oil circulation path for flowing cooling oil therethrough to cool the drive shaft body.

9. The tool holder clamp device for spindle of claim 1, wherein the cooling mechanism comprises a thermoelectric element attached to the drive shaft body.

10. A spindle apparatus for machine tools comprising:

a spindle member axially hollowed;

a first drive for driving the spindle member to rotate;

a tool holder;

a clamp bolt member axially movable in the spindle member and rotatable to clamp the tool holder to the spindle member;

a draw-bar member axially movable in the spindle member and rotatable to rotate the clamp bolt member; and a second drive for driving the draw-bar member to rotate.

11. The spindle apparatus of claim 10, wherein the draw-bar member has a coolant circuit formed therein.

12. The spindle apparatus of claim 10, wherein the draw-bar member has a thermoelectric element attached thereto.

* * * * *